R. HOFFMANN.
APPARATUS FOR MACERATING WORT.
APPLICATION FILED MAY 5, 1911.
1,015,443.
Patented Jan. 23, 1912.
Fig.1.
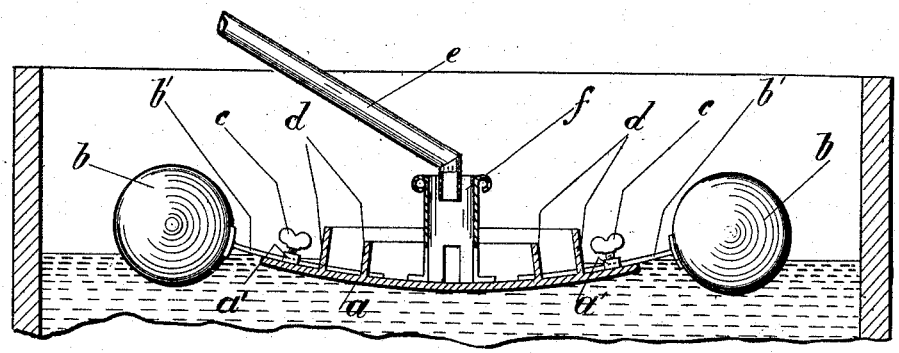
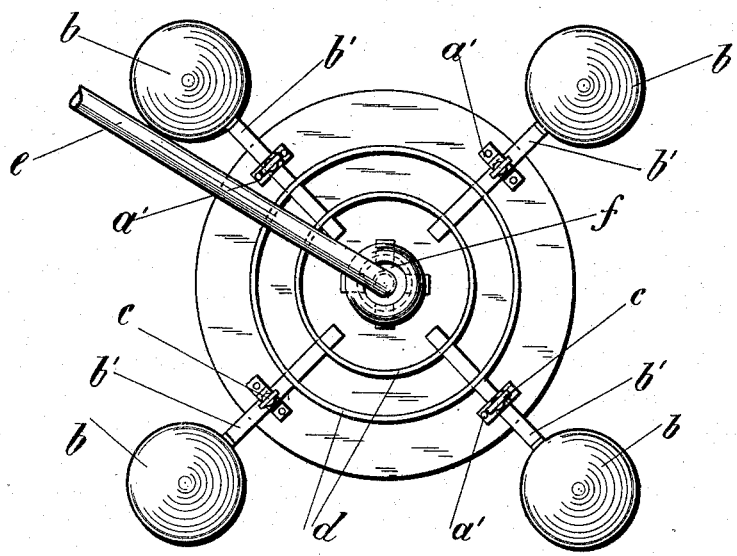
Fig.2.
Witnesses:
M. Hefling
H C Hundberger
Inventor,
Robert Hoffmann,
By B. Singer
Attorney

UNITED STATES PATENT OFFICE.

ROBERT HOFFMANN, OF ORTELSBURG, GERMANY.

APPARATUS FOR MACERATING WORT.

1,015,443.  Specification of Letters Patent.  Patented Jan. 23, 1912.

Application filed May 5, 1911. Serial No. 625,357.

*To all whom it may concern:*

Be it known that I, ROBERT HOFFMANN, a subject of the King of Prussia, and resident of Ortelsburg, Germany, have invented new and useful Improvements in Apparatus for Macerating Wort, of which the following is a specification.

In macerating the wort in making beer the sparging water has hitherto been poured on to the wort by means of a rotary sprayer spraying over or sparging the wort. As the sparging water falls from a certain height on to the surface of the wort it is not only impossible to avoid unintentionally mixing the wort with the sparging water, but the latter is also undesirably cooled. Both disadvantages thus involve a loss of yield from the grain and thus mean an incomplete working.

Now as compared with the ordinary apparatus for maceration this invention consists in the sparging water not being allowed to fall from a height on to the surface of the wort but being introduced in layers on to the surface of the wort, so that the grain during maceration is slowly compressed by the sparging water and does not mix therewith.

This improved apparatus consists in other words in the sparging water being allowed to flow on to the wort in a continuous stream without first having to fall through the air on to the surface of the wort.

By means of this invention not only is the considerable cooling of the sparging water avoided which takes place by the splashing, but an increase of the yield to the amount of from ½ to 2% and a shortening of the extraction time from 1 to 1½ hours, is obtained.

For carrying out my invention a dish or plate floating on the wort may be employed into which dish the sparging water is conducted by means of a closed pipe and over the edge of which it spreads onto the surface of the wort flowing slowly over the edge of the dish. The dish may be provided with floats in order that it may be always maintained floating at a uniform level. These floats hold the edges of the dish some millimeters below the surface of the wort or the sparging water. For the introduction of the water the dish is preferably provided with a funnel which also may be utilized for retaining the dish as far as possible in the middle of the vat.

In the drawing:—Figure 1 is a section; and Fig. 2, a plan view.

This apparatus consists of a dish $a$, for instance of sheet aluminium, to which a number of floating bodies $b$, (for instance four as shown in the drawings), are attached. The connection between the dish $a$ and the floating bodies $b$ is preferably adjustably arranged, by each float being carried by a bar $b'$ in straps $a'$ on the dish and adapted to be adjusted by hand screws $c$ in its distance from and the height above the edges of the dish. It is thereby possible to give the edge of the dish any desired position beneath the level of the liquid. It usually suffices for the edge of the dish to be about 5 millimeters from the level of the liquid. The distributing dish $a$ always maintains its level when once adjusted even when a full supply of water is admitted. Some cylindrical rings $d$ or like impediments which prevent a too rapid discharge of the sparging water from the feed pipe $e$ which discharges at the middle of the dish, may also be provided which further insure a uniform distribution of the water over the entire periphery of the dish. A funnel or guide nozzle $f$ is provided in the middle of the dish which funnel is perforated at its lower edge and also is arranged to receive the feed pipe $e$. As this pipe $e$ can be easily fixed to the edge of the vat or at some other place, it also serves for retaining the floating dish $a$ in the middle of the vat or in some other desired position. The floating dish may also be made in a form differing from that shown in the drawings. For instance the hollow floating bodies may be replaced by wooden floats. Galvanized sheet iron may also be employed as material for the dish as well as for the floats.

I declare that what I claim is:—

1. An apparatus for macerating wort, comprising in combination, means for conveying the sparging water to and discharging the same closely adjacent to the surface of the wort, and a plate suspended by the wort for receiving said sparging water.

2. An apparatus for macerating wort comprising in combination, means for conveying the sparging water thereto and discharging the same closely adjacent the surface of the wort, and a floating plate by the wort for receiving the sparging water, substantially as described.

3. An apparatus for macerating wort comprising in combination, means conveying the sparging water to and discharging the same closely adjacent the surface of the wort, a plate for receiving the sparging water, and floats on which said plate is suspended.

4. An apparatus for macerating wort comprising in combination, means conveying the sparging water to and discharging the same closely adjacent the surface of the wort, a plate for receiving the wort, and floats suspending said plate below the surface of the wort.

5. An apparatus for macerating wort comprising in combination, means conveying the sparging water to and discharging the same closely adjacent to the surface of the wort, a plate provided with ribs for receiving the wort, and floats adjustably mounted upon said plate for suspending the same below the surface of the wort.

In testimony, that I claim the foregoing as my invention, I have signed my name in presence of two witnesses, this 19th day of April, 1911.

ROBERT HOFFMANN.

Witnesses:
   KURT SPEIDEL,
   ALBERT JUST.

---

Copies of this patent may be obtained for five cents each, by addressing the "Commissioner of Patents, Washington, D. C."